United States Patent
Soles et al.

(10) Patent No.: US 7,484,745 B2
(45) Date of Patent: Feb. 3, 2009

(54) BRINELLING BUSHING JOINT ASSEMBLY

(75) Inventors: Peter J. Soles, Tecumseh (CA); John T. Monaghan, Holly, MI (US); Keith E. Olson, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 415 days.

(21) Appl. No.: 11/369,806

(22) Filed: Mar. 7, 2006

(65) Prior Publication Data

US 2007/0210551 A1    Sep. 13, 2007

(51) Int. Cl.
*B60G 9/02* (2006.01)
*B60G 11/12* (2006.01)
*F16C 33/04* (2006.01)

(52) U.S. Cl. .................. 280/124.116; 384/276; 267/271; 403/150

(58) Field of Classification Search .......... 280/124.175, 280/124.116; 384/276; 267/271; 403/150, 403/151, 154, 165, 157, 156
See application file for complete search history.

(56) References Cited

U.S. PATENT DOCUMENTS

| | | | | |
|---|---|---|---|---|
| 3,851,982 | A * | 12/1974 | See | 403/224 |
| 4,077,655 | A * | 3/1978 | Skahill | 280/756 |
| 5,120,195 | A * | 6/1992 | Schmaling et al. | 416/134 A |
| 6,808,333 | B2 * | 10/2004 | Friesen et al. | 403/158 |
| 2004/0080135 | A1 * | 4/2004 | Dudding et al. | 280/124.163 |
| 2004/0086325 | A1 * | 5/2004 | Friesen et al. | 403/150 |
| 2007/0040347 | A1 * | 2/2007 | Fenton | 280/124.174 |

* cited by examiner

*Primary Examiner*—Ruth Ilan
*Assistant Examiner*—Karen Amores

(57) ABSTRACT

The invention concerns a brinelling bushing joint assembly having a brinelling bushing sleeve with a brinelling feature that mates with a bracket. This joint assembly may be particularly advantageous when employed to connect a vehicle frame to a vehicle suspension.

15 Claims, 3 Drawing Sheets

US 7,484,745 B2

BRINELLING BUSHING JOINT ASSEMBLY

BACKGROUND OF INVENTION

The present invention relates generally to a joint assembly, and in particular to a joint assembly that may be employed in a vehicle suspension.

Bushings are often used in joint assemblies where one component must be able to pivot relative to the other. Such assemblies may include a bolt that extends through the bushing and a bracket attached to a first component, with a second component mounted about the bushing. For example, some locations where components of a vehicle suspension mount to components of a vehicle frame may include such joint assemblies.

Often, these joint assemblies, and so the fasteners within them, must withstand high loading. Some have employed separate brinelling (conical) washers between bushing sleeves and brackets to help withstand the high loading. But this adds extra parts to an assembly and extra steps to the process of assembling these joints. Others have added serrations machined into the ends of a bushing sleeve to help withstand the high loading. Upon clamping the bolt/nut combination, the serrations sink into the inside surface of the bracket material. But the serrations are somewhat destructive to the bracket, making re-assembly of a joint assembly more difficult than is desired.

SUMMARY OF INVENTION

An embodiment of the present invention may contemplate a brinelling bushing joint assembly. The brinelling bushing joint assembly may comprise a bracket having a main body, a first bracket ear extending from the main body and a second bracket ear extending from the main body and spaced from the first bracket ear, with the first bracket ear including a first bracket hole having a first bracket chamfer and the second bracket ear including a second bracket hole having a second bracket chamfer. The brinelling bushing joint assembly may also include a brinelling bushing sleeve having a first end, a second end, a main bore extending from the first end to the second end, a first brinelling feature extending from the first end adjacent to the main bore and in mating engagement with the first bracket chamfer, and a second brinelling feature extending from the second end adjacent to the main bore and in mating engagement with the second bracket chamfer.

An embodiment according to the present invention may contemplate a brinelling bushing joint assembly. The brinelling bushing joint assembly may comprise a bracket having a first bracket ear including a first bracket hole having a first bracket chamfer, and a brinelling bushing sleeve having a first end with a main bore extending therethrough, and a first brinelling feature having a generally conical shape and extending from the first end adjacent to the main bore and being in mating engagement with the first bracket chamfer.

An embodiment according to the present invention may contemplate a vehicle comprising a vehicle frame, a vehicle suspension including a component, and a brinelling bushing joint assembly. The brinelling bushing joint assembly may include a bracket affixed to one of the vehicle frame and the vehicle suspension and having a main body, a first bracket ear extending from the main body and a second bracket ear extending from the main body and spaced from the first bracket ear, with the first bracket ear including a first bracket hole having a first bracket chamfer and the second bracket ear including a second bracket hole having a second bracket chamfer; and a brinelling bushing sleeve operatively engaging the component and having a first end, a second end, a main bore extending from the first end to the second end, a first brinelling feature extending from the first end adjacent to the main bore and in mating engagement with the first bracket chamfer, and a second brinelling feature extending from the second end adjacent to the main bore and in mating engagement with the second bracket chamfer.

An advantage of an embodiment of the present invention is that the brinelling bushing joint assembly may be able to withstand higher loading due to the mechanical lock between the brinelling bushing sleeve and the bracket, while minimizing the number of parts used in the joint. This also minimizes the assembly time for the joint, which may reduce the overall cost.

An advantage of an embodiment of the present invention is that the joint efficiency created by the mechanical lock between the brinelling bushing sleeve and the bracket may allow, for particular vehicle applications, a reduced fastener sizing. This reduction may result in a reduced fastener and component part mass and cost, and a reduced fastener joint size for improved packaging efficiency.

An advantage of an embodiment of the present invention is that the brinelling bushing joint assembly may reassemble relatively easily even though the brinelling feature may cause some displacement of bracket material by the brinelling features on the brinelling bushing sleeve.

DETAILED DESCRIPTION

Figure 1:
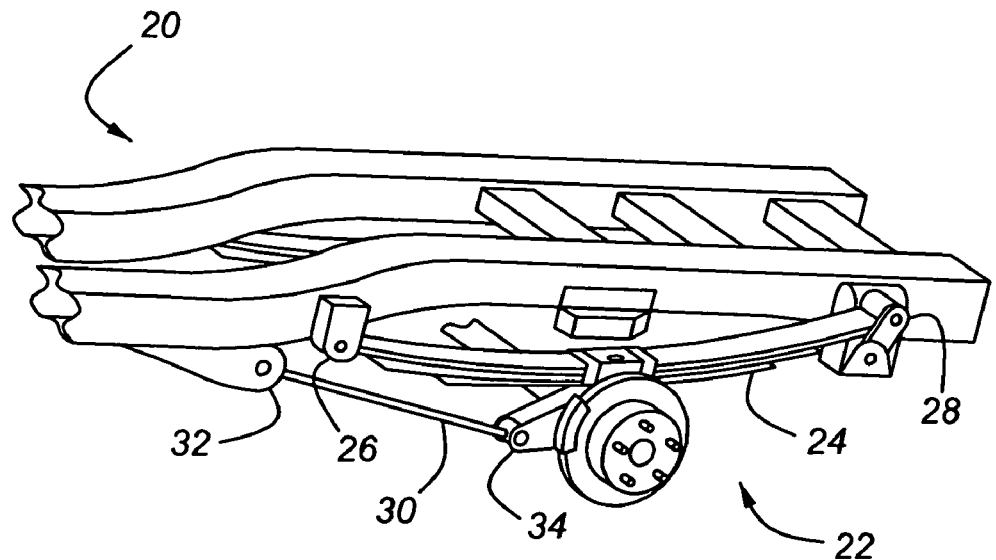
FIG. 1 is a perspective view of a portion of a vehicle frame and suspension incorporating brinelling bushing joint assemblies, in accordance with the present invention.

FIG. 1 illustrates a vehicle frame, indicated generally at 20, having a vehicle suspension, indicated generally at 22, mounted thereto. When using the term vehicle frame herein, this term also includes structure such as a sub-frame or an integral body frame. The vehicle suspension 22 has a leaf spring 24, with a front joint assembly 26 and a rear joint assembly 28. The vehicle suspension 22 also has an anti-windup link 30, with a front joint assembly 32 and a rear joint assembly 34. The front and rear joint assemblies 26, 28 for the spring 24 and the front and rear joint assemblies 32, 34 for the anti-windup link 30 are examples of vehicle locations where a brinelling bushing joint assembly 36 (illustrated in detail in FIGS. 2-7) may be used. Of course, the joint assembly of the present invention can also be used in other applications where the capability to handle high joint loads is desired.

Figure 2:
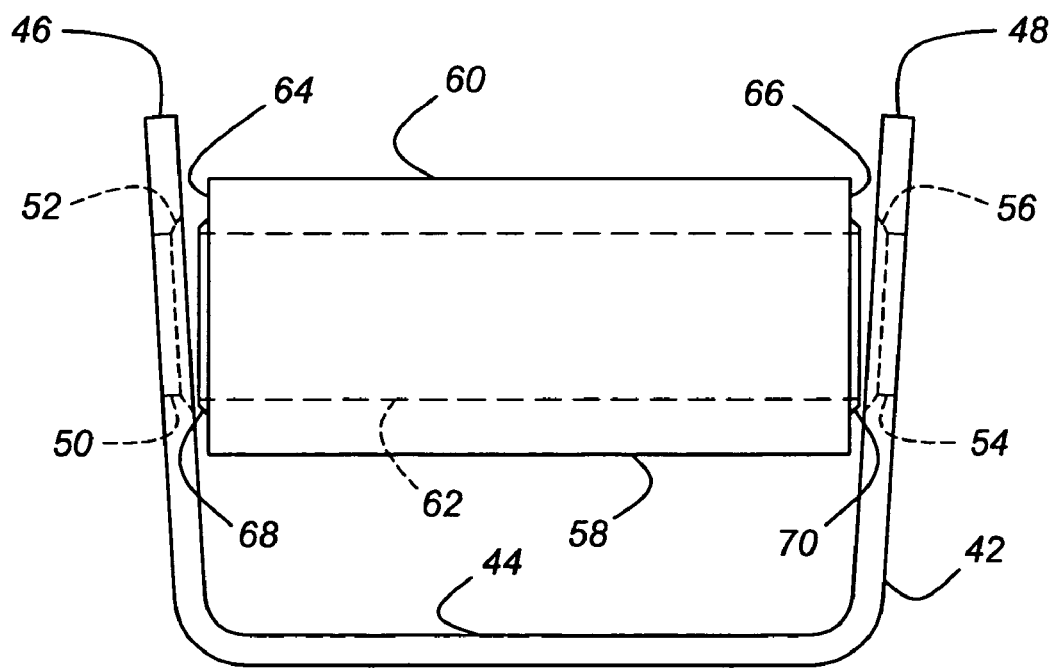
FIG. 2 is a side view of a portion of a brinelling bushing joint assembly prior to application of a clamp load, in accordance with the present invention.
Figure 3:
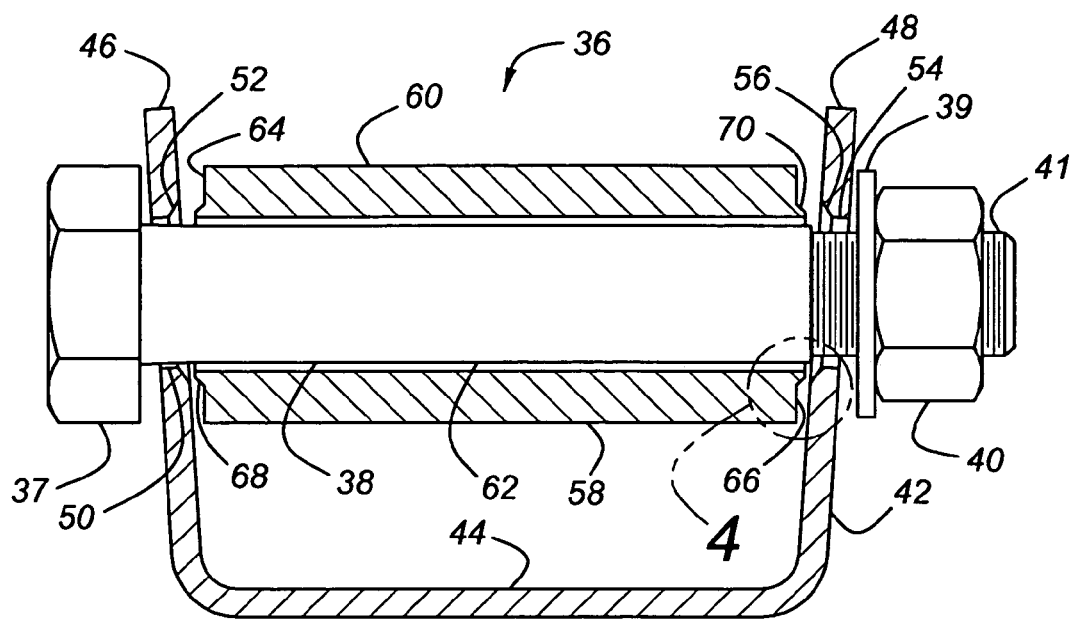
FIG. 3 is a view similar to FIG. 2, but showing a section cut through a portion of the joint assembly and a fastener mounted therein.
Figures 4, 7:
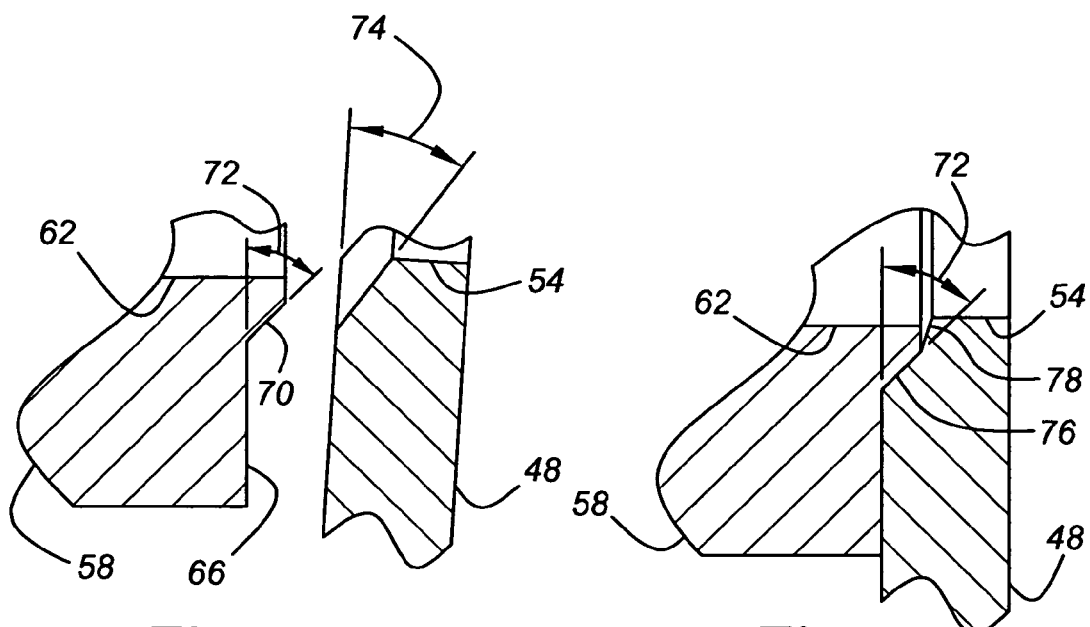
FIG. 4 is an enlarged view of encircled area 4 in FIG. 3.
FIG. 7 is an enlarged view of encircled area 7 in FIG. 6.

FIGS. 2-4 illustrate the brinelling bushing joint assembly 36 prior to a fastener—such as a bolt 38 with a head 37 and threaded shank 41—and a nut 40 and washer 39 are used to clamp the joint assembly 36 together. The joint assembly 36 includes a bracket 42 having a main body 44 with a first bracket ear 46 and a second bracket ear 48 extending therefrom. The main body 44 may be a portion of the vehicle frame 20 or vehicle suspension 22 (shown in FIG. 1), or may be a separate member affixed to the frame 20 or suspension 22. The first bracket ear 46 includes a first bracket hole 50 having a first bracket chamfer 52. The second bracket ear 48 includes a second bracket hole 54 having a second bracket chamfer 56.

The joint assembly 36 also includes a brinelling bushing sleeve 58 having a generally cylindrical outer surface 60. A main bore 62 extends through the brinelling bushing sleeve 58 from a first end 64 to a second end 66. A first brinelling feature 68 extends from the first end 64 and surrounds the main bore 62, while a second brinelling feature 70 extends from the second end 66 and surrounds the main bore 62. The first and second brinelling features 68, 70 are generally conical in shape and have an angle that may differ from the angles of the corresponding bracket chamfers 52, 56, as will be discussed below.

FIG. 4 shows the second brinelling feature 70 projecting from the second end 66 of the brinelling bushing sleeve 58 around the main bore 62, and the second bracket ear 48 having the second bracket hole 54. The second brinelling feature 70 extends outward from the second end 66 at a brinelling angle 72. The second bracket hole 54 includes the second bracket chamfer, which is recessed into the second bracket ear 48 at a chamfer angle 74. The chamfer angle 74 is preferably different than the brinelling angle 72 and is more preferably smaller than the brinelling angle 72. The reason for this will be discussed below relative to FIGS. 5-7, which show the brinelling bushing joint assembly 36 after the clamping load from the bolt 38 and nut 40 have been applied. In addition, while FIG. 4 only shows the brinelling angle 72 and chamfer angle 74 in greater detail at the second end 66 of the brinelling bushing sleeve, the first end is shown in general in other figures and is preferably the same (although it does not need to be identical) and so will not be shown in greater detail herein.

Figure 5:
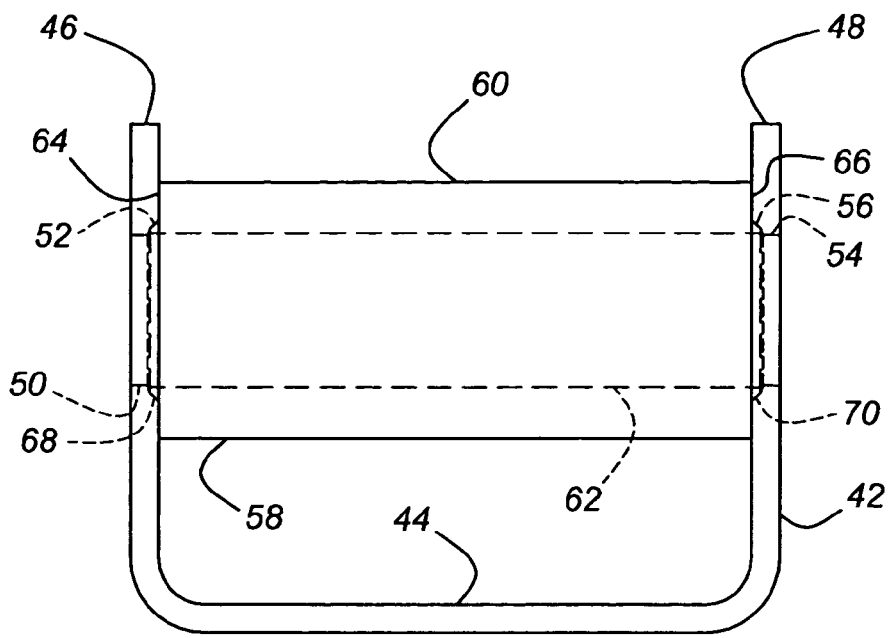
FIG. 5 is a view similar to FIG. 2, but showing the joint assembly after application of a clamp load.
Figure 6:
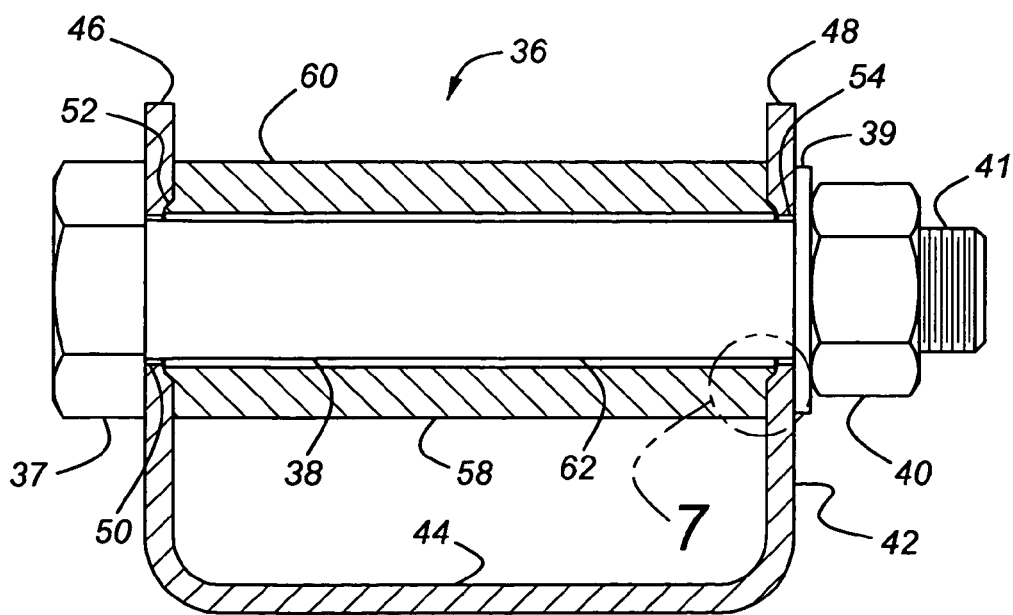
FIG. 6 is a view similar to FIG. 3, but showing the joint assembly after application of a clamp load.

FIGS. 5-7 illustrate the brinelling bushing joint assembly 36 after the fastener 38 and the nut 40 clamp the joint assembly 36 together. Elements in these figures are the same as those in FIGS. 2-4 and so will be identified with the same element numbers. As the components are assembled onto a vehicle, the threaded shank 41 of the bolt 38 is inserted through the first bracket hole 50 in the first bracket ear 46, through the main bore 62 in the brinelling bushing sleeve 58, and through the second bracket hole 54 in the second bracket ear 48. The washer 39 and nut 40 are assembled to the bolt 38 and a torque is applied between the head 37 and the nut 40. This creates a clamping force that pulls the bracket ears 46, 48 together, pressing them against the first and second ends 64, 66, respectively, of the brinelling bushing sleeve 58. As the bracket ears 46, 48 are pulled against the first and second ends 64, 66 by the clamping force, each brinelling feature 68, 70 is received in and so positively engages with its corresponding bracket chamfer 52, 56. In addition, as discussed above, the chamfer angle 74 is preferably smaller than the brinelling angle 72, which creates a mechanical engagement between the brinelling bushing sleeve 58 and the bracket 42, as discussed below.

FIG. 7 shows in greater detail how the mechanical engagement is achieved between the brinelling bushing sleeve 58 and the second bracket ear 48 (with the brinelling bushing sleeve 58 and the first bracket ear 46 engaging in the same or a similar manner). As the clamping load is being applied, the brinelling bushing sleeve 58 is pulled against the second bracket ear 48, causing the second brinelling feature, being at the larger brinelling angle 72, to press into and displace material in the second bracket hole 54. This creates a displaced portion 76 (and possibly leaves a non-displaced portion 78) of the second bracket chamfer.

One can see, then, from the brinelling bushing joint assembly 36 illustrated in FIGS. 5-7 that there is now a mechanical engagement—with no gaps from fabrication or assembly tolerances—between the first and second brinelling features 68, 70 and their respective first and second bracket chamfers 52, 56. Since the brinelling bushing sleeve 58 engages the bracket 42 at the first and second bracket holes 50, 54, additional loading capability is provided to the joint for a given size bolt employed in the brinelling bushing joint assembly 36, but without the need for additional parts and the extra assembly time that goes with them. And this is accomplished while still allowing for relatively easy reassembly of the brinelling bushing joint assembly 36 should the need arise during servicing of a particular vehicle. Moreover, with the chamfer angle 74 being only somewhat smaller than the brinelling angle 72, the material displacement is minimized and so the bolt clamp load required to lock the brinelling bushing sleeve 58 to the bracket 42 is minimized, thus allowing for smaller diameter fasteners for a given joint loading.

While certain embodiments of the present invention have been described in detail, those familiar with the art to which this invention relates will recognize various alternative designs and embodiments for practicing the invention as defined by the following claims.

What is claimed is:

1. A brinelling bushing joint assembly comprising:
   a bracket having a main body, a first bracket ear extending from the main body and a second bracket ear extending from the main body and spaced from the first bracket ear, the first bracket ear including a first bracket hole having a first bracket chamfer and the second bracket ear including a second bracket hole having a second bracket chamfer; and
   a brinelling bushing sleeve having a first end, a second end, a main bore extending from the first end to the second end, a first brinelling feature extending from the first end adjacent to the main bore and in mating engagement with the first bracket chamfer, and a second brinelling feature extending from the second end adjacent to the main bore and in mating engagement with the second bracket chamfer; wherein the first brinelling feature is a generally conical shape and is oriented at a first brinelling angle, and the first bracket chamfer includes a first portion that is oriented at the first brinelling angle and in mating contact with the first brinelling feature and a second portion that is oriented at a first chamfer angle that is different than the first brinelling angle.

2. The brinelling bushing joint assembly of claim 1 further comprising a fastener extending through the first and second bracket holes and the main bore, and a nut operatively engaging the fastener to apply a clamp load between the brinelling bushing sleeve and the first and second bracket ears.

3. The brinelling bushing joint assembly of claim 1 wherein the second bracket chamfer includes a portion that is oriented at a second chamfer angle and the second brinelling feature is a generally conical shape and is oriented at a second brinelling angle that is different than the second chamfer angle.

4. The brinelling bushing joint assembly of claim 3 wherein the second bracket chamfer includes a displaced portion in engagement with the second brinelling feature and is oriented at the second brinelling angle.

5. The brinelling bushing joint assembly of claim 1 wherein the first portion of the first bracket chamfer is a displaced portion in mating engagement with the first brinelling feature and the second portion of the first bracket chamfer is a non-displaced portion that is not in mating engagement with the first brinelling feature.

6. The brinelling bushing joint assembly of claim 1 wherein the second brinelling feature is a generally conical shape and is oriented at a second brinelling angle, and the second bracket chamfer includes a first portion that is oriented at the second brinelling angle and in mating contact with the second brinelling feature, and a second portion that is oriented at a second chamfer angle.

7. The brinelling bushing joint assembly of claim 1 wherein the bracket forms a portion of one of a vehicle frame and a vehicle suspension.

8. A brinelling bushing joint assembly comprising:
   a bracket having a first bracket ear including a first bracket hole having a first bracket chamfer; and
   a brinelling bushing sleeve having a first end with a main bore extending therethrough, and a first brinelling feature having a generally conical shape and extending from the first end adjacent to the main bore and in mating engagement with the first bracket chamfer; wherein the first brinelling feature is a generally conical shape and is oriented at a first brinelling angle, and the first bracket chamfer includes a first portion that is oriented at the first brinelling angle and in mating contact with the first brinelling feature and a second portion that is oriented at a first chamfer angle that is different than the first brinelling angle.

9. The brinelling bushing joint assembly of claim 8 wherein the bracket further comprises a second bracket ear including a second bracket hole having a second bracket chamfer, and the brinelling bushing sleeve further comprises an opposed second end with the main bore extending therethrough, and a second brinelling feature having a generally conical shape and extending from the second end adjacent to the main bore and in mating engagement with the second bracket chamfer.

10. The brinelling bushing joint assembly of claim 8 wherein the first portion of the first bracket chamfer is a displaced portion in mating engagement with the first brinelling feature and the second portion of the first bracket chamfer is a non-displaced portion that is not in mating engagement with the first brinelling feature.

11. The brinelling bushing joint assembly of claim 8 wherein the bracket forms a portion of one of a vehicle frame and a vehicle suspension.

12. A vehicle comprising:
   a vehicle frame;
   a vehicle suspension including a component; and
   a brinelling bushing joint assembly including a bracket affixed to one of the vehicle frame and the vehicle suspension and having a main body, a first bracket ear extending from the main body and a second bracket ear extending from the main body and spaced from the first bracket ear, the first bracket ear including a first bracket hole having a first bracket chamfer and the second bracket ear including a second bracket hole having a second bracket chamfer; and a brinelling bushing sleeve operatively engaging the component and having a first end, a second end, a main bore extending from the first end to the second end, a first brinelling feature extending from the first end adjacent to the main bore and in mating engagement with the first bracket chamfer, and a second brinelling feature extending from the second end adjacent to the main bore and in mating engagement with the second bracket chamfer; wherein the first brinelling feature is a generally conical shape and is oriented at a first brinelling angle, and the first bracket chamfer includes a first portion that is oriented at the first brinelling angle and in mating contact with the first brinelling feature and a second portion that is oriented at a first chamfer angle that is different than the first brinelling angle.

13. The vehicle of claim 12 wherein the component is an anti-windup link.

14. The vehicle of claim 12 further comprising a fastener extending through the first and second bracket holes and the main bore, and a nut operatively engaging the fastener to apply a clamp load between the brinelling bushing sleeve and the first and second bracket ears.

15. The vehicle of claim 12 wherein the second brinelling feature is a generally conical shape and is oriented at a second brinelling angle, and wherein the second bracket chamfer includes a displaced portion in mating engagement with the second brinelling feature and a non-displaced portion that is not in mating engagement with the second brinelling feature.

* * * * *